United States Patent
Takatsuka et al.

(10) Patent No.: US 10,721,546 B2
(45) Date of Patent: Jul. 21, 2020

(54) INCOMING CALL CONTROLLING DEVICE, INCOMING CALL CONTROLLING SYSTEM, AND INCOMING CALL CONTROLLING METHOD

(71) Applicants: NEC Platforms, Ltd., Kawasaki-shi, Kanagawa (JP); NIPPON TELEGRAPH AND TELEPHONE EAST CORPORATION, Tokyo (JP); NIPPON TELEGRAPH AND TELEPHONE WEST CORPORATION, Osaka-shi, Osaka (JP)

(72) Inventors: Fumitaka Takatsuka, Kanagawa (JP); Kaori Utsunomiya, Kanagawa (JP); Shigeki Shimizu, Tokyo (JP); Ryotaro Hachiya, Tokyo (JP); Kyoko Kanafuka, Osaka (JP); Akira Morimoto, Osaka (JP)

(73) Assignees: NEC Platforms, Ltd., Kawasaki-shi, Kanagawa (JP); NIPPON TELEGRAPH AND TELEPHONE EAST CORPORATION, Shinjuku-ku, Tokyo (JP); NIPPON TELEGRAPH AND TELEPHONE WEST CORPORATION, Osaka-shi, Osaka (JP)

(*) Notice: Subject to any disclaimer, the term of this patent is extended or adjusted under 35 U.S.C. 154(b) by 0 days.

(21) Appl. No.: 16/481,965

(22) PCT Filed: Jan. 11, 2019

(86) PCT No.: PCT/JP2019/000611
§ 371 (c)(1),
(2) Date: Jul. 30, 2019

(87) PCT Pub. No.: WO2019/139106
PCT Pub. Date: Jul. 18, 2019

(65) Prior Publication Data
US 2019/0394540 A1    Dec. 26, 2019

(30) Foreign Application Priority Data

Jan. 15, 2018 (JP) ................. 2018-004133

(51) Int. Cl.
*H04Q 3/72* (2006.01)
*H04Q 3/58* (2006.01)
(Continued)

(52) U.S. Cl.
CPC .......... *H04Q 3/72* (2013.01); *H04M 3/42042* (2013.01); *H04M 3/42314* (2013.01); *H04Q 3/58* (2013.01); *H04W 4/16* (2013.01)

(58) Field of Classification Search
CPC .................. H04M 9/00; H04M 19/00; H04M 2203/1016; H04M 3/28; H04M 3/42314;
(Continued)

(56) References Cited

U.S. PATENT DOCUMENTS 9,820,116 B2 * 11/2017 Piscopo, Jr. .......... H04L 67/141
10,122,682 B1 * 11/2018 Salour .................. H04M 7/006
(Continued)

FOREIGN PATENT DOCUMENTS

JP    2002-300622 A    10/2002
JP    2007-097051 A    4/2007
(Continued)

OTHER PUBLICATIONS

International Search Report of PCT/JP2019/000611 dated Feb. 5, 2019 [PCT/ISA/210].
(Continued)

*Primary Examiner* — Liton Miah
(74) *Attorney, Agent, or Firm* — Sughrue Mion, PLLC

(57) ABSTRACT

An incoming call controlling device (2) includes a connection determining unit (3) configured to determine, when an incoming call to a first phone number is received, whether
(Continued)

a mobile phone terminal (6) is connected as an extension phone to the incoming call controlling device (2); an incoming call controlling unit (4) configured to transfer the incoming call to a second phone number when it has been determined that the mobile phone terminal (6) is not connected to the incoming call controlling device (2); and a caller information transmitting unit (5) configured to transmit, to a server (7), identification information and caller information of the incoming call when a transfer by the incoming call controlling unit (4) is performed. The server (7) is configured to notify a phone terminal of the caller information by using a network different from a circuit used for the transfer.

13 Claims, 4 Drawing Sheets

(51) Int. Cl.
*H04W 4/16* (2009.01)
*H04M 3/42* (2006.01)

(58) Field of Classification Search
CPC . H04M 3/465; H04M 7/006; H04W 52/0267; H04W 52/028; H04W 84/16
See application file for complete search history.

(56) References Cited

U.S. PATENT DOCUMENTS

| | | | |
|---|---|---|---|
| 2002/0173292 A1* | 11/2002 | Boatwright | H04M 3/382 455/410 |
| 2009/0059901 A1 | 3/2009 | Wei et al. | |
| 2011/0163848 A1* | 7/2011 | Shibata | H04M 3/42263 340/10.1 |
| 2011/0231862 A1* | 9/2011 | Walsh | G06F 13/00 719/318 |
| 2013/0343205 A1* | 12/2013 | Dolan | H04M 3/2236 370/250 |
| 2018/0183931 A1* | 6/2018 | Quattrocchi | G06F 40/103 |

FOREIGN PATENT DOCUMENTS

| | | |
|---|---|---|
| JP | 2011-109470 A | 6/2011 |
| JP | 2014-158191 A | 8/2014 |
| JP | 2017169023 A | 9/2017 |

OTHER PUBLICATIONS

Communication dated Mar. 6, 2020, from the European Patent Office in application No. 19738278.1

\* cited by examiner

INCOMING CALL CONTROLLING DEVICE, INCOMING CALL CONTROLLING SYSTEM, AND INCOMING CALL CONTROLLING METHOD

CROSS REFERENCE TO RELATED APPLICATIONS

This application is a National Stage of International Application No. PCT/JP2019/000611, filed Jan. 11, 2019, claiming priority based on Japanese Patent Application No. 2018-004133, filed Jan. 15, 2018, the contents of all of which are incorporated herein by reference in their entirety.

TECHNICAL FIELD

The present invention relates to incoming call controlling devices, incoming call controlling systems, incoming call controlling methods, and programs.

BACKGROUND ART

In communication in business activities, phones are used commonly not only indoors, such as inside company buildings, but also outdoors. As a technique related to such a phone use environment, for example, Patent Literature 1 discloses a private branch phone system that includes a fixed-line phone terminal and a mobile phone terminal.

This private branch phone system includes a connection switching unit that switches whether an incoming call to a phone number assigned to the fixed-line phone is to be connected to the fixed-line phone or to a mobile phone terminal via the fixed-line phone. Thus, the private branch phone system can switch whether the fixed-line phone or the mobile phone terminal is to be used.

CITATION LIST

Patent Literature

Patent Literature 1: Japanese Unexamined Patent Application Publication No. 2002-300622

SUMMARY OF INVENTION

Technical Problem

According to Patent Literature 1, in order to achieve the user's indoor call mode and outdoor call mode, two phone terminals in total including a fixed-line phone and a mobile phone terminal are required. However, with the spread of mobile phone terminals in recent years, mobile phone terminals, such as smartphones, are increasingly used in business phones in indoor calls. Therefore, there is a need that a single mobile phone terminal not only be used outdoors but also be used as an extension phone terminal indoors. In addition, when this single mobile phone terminal is not merely a terminal dedicated for business use but a terminal owned by an individual for personal use, for example, information such as an incoming call history in this mobile phone terminal needs to be managed appropriately for security reasons.

Accordingly, one object to be achieved by example embodiments disclosed in the present specification is to provide an incoming call controlling device, an incoming call controlling system, an incoming call controlling method, and a program that, when a mobile phone terminal to be used as an extension phone terminal is carried outdoors, can appropriately notify this mobile phone terminal of caller information.

Solution to Problem

An incoming call controlling device according to a first aspect is an incoming call controlling device that controls an incoming call from a phone network. The incoming call controlling device includes connection determining means for determining, when an incoming call to a first phone number is received, whether a mobile phone terminal pre-associated with the first phone number is connected as an extension phone to the incoming call controlling device; incoming call controlling means for transferring the incoming call to a second phone number when the connection determining means has determined that the mobile phone terminal is not connected to the incoming call controlling device, the second phone number being a mobile phone number of the mobile phone terminal; and caller information transmitting means for transmitting, to a server, identification information for identifying the mobile phone terminal and caller information of the incoming call when a transfer by the incoming call controlling means is performed, the server being configured to notify a phone terminal of the caller information by using a network different from a circuit used for the transfer.

An incoming call controlling system according to a second aspect includes an incoming call controlling device configured to control an incoming call from a phone network; and a server configured to notify a phone terminal of caller information. The incoming call controlling device includes connection determining means for determining, when an incoming call to a first phone number is received, whether a mobile phone terminal pre-associated with the first phone number is connected as an extension phone to the incoming call controlling device; incoming call controlling means for transferring the incoming call to a second phone number when the connection determining means has determined that the mobile phone terminal is not connected to the incoming call controlling device, the second phone number being a mobile phone number of the mobile phone terminal; and caller information transmitting means for transmitting, to the server, identification information for identifying the mobile phone terminal and the caller information of the incoming call when a transfer by the incoming call controlling means is performed. The server is configured to transmit the caller information of the incoming call to the mobile phone terminal identified by the identification information by using a network different from a circuit used for the transfer.

An incoming call controlling method according to a third aspect includes determining, when an incoming call to a first phone number is received, whether a mobile phone terminal pre-associated with the first phone number is connected as an extension phone to an incoming call controlling device; transferring the incoming call to a second phone number when it has been determined that the mobile phone terminal is not connected to the incoming call controlling device, the second phone number being a mobile phone number of the mobile phone terminal; and transmitting, to a server, identification information for identifying the mobile phone terminal and caller information of the incoming call when the transferring is performed, the server being configured to notify a phone terminal of the caller information by using a network different from a circuit used for the transferring.

A program according to a fourth aspect causes a computer to execute a connection determining step of determining, when an incoming call to a first phone number is received, whether a mobile phone terminal pre-associated with the first phone number is connected as an extension phone to an incoming call controlling device; an incoming call controlling step of transferring the incoming call to a second phone number when it has been determined that the mobile phone terminal is not connected to the incoming call controlling device, the second phone number being a mobile phone number of the mobile phone terminal; and a caller information transmitting step of transmitting, to a server, identification information for identifying the mobile phone terminal and caller information of the incoming call when the transferring is performed, the server being configured to notify a phone terminal of the caller information by using a network different from a circuit used for the transferring.

Advantageous Effects of Invention

The foregoing aspects can provide an incoming call controlling device, an incoming call controlling system, an incoming call controlling method, and a program that, when a mobile phone terminal to be used as an extension phone terminal is carried outdoors, can appropriately notify this mobile phone terminal of caller information.

DESCRIPTION OF EMBODIMENTS

Overview of Example Embodiments

Figure 1:
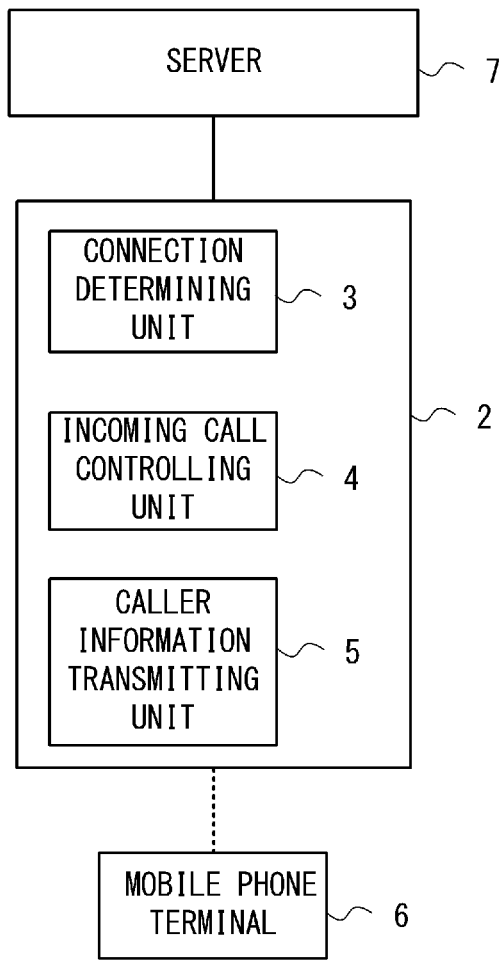
FIG. 1 is a block diagram illustrating an example of a configuration of an incoming call controlling device according to an overview of an example embodiment.

Prior to describing example embodiments, an overview of example embodiments according to the present invention will be described. FIG. 1 is a block diagram illustrating an example of a configuration of an incoming call controlling device 2 according to an overview of an example embodiment. FIG. 1 illustrates an incoming call controlling system 1 that includes the incoming call controlling device 2, a mobile phone terminal 6, and a server 7.

The incoming call controlling device 2 controls incoming calls from a phone network.

The mobile phone terminal 6 is used indoors and outdoors. When the mobile phone terminal 6 is connected to the incoming call controlling device 2, the mobile phone terminal 6 functions as an indoor-use extension phone terminal that can be reached by calling a first phone number. In this manner, the mobile phone terminal 6 is pre-associated with the first phone number in the incoming call controlling device 2. Therefore, when the mobile phone terminal 6 is used as an extension phone terminal, a call to the first phone number received by the incoming call controlling device 2 is routed to the mobile phone terminal 6. When the mobile phone terminal 6 is not connected to the incoming call controlling device 2 (i.e., when the mobile phone terminal 6 is being carried outdoors), the mobile phone terminal 6 functions as a normal mobile phone that can be reached by calling a second phone number (mobile phone number).

The server 7 notifies a phone terminal of caller information. For example, the server 7 notifies the mobile phone terminal 6 of a caller's phone number (hereinafter, referred to as a "true caller number") of a call made to the first phone number received by the incoming call controlling device 2 from the phone network. The server 7 transmits the caller information via a network different from a circuit used by the incoming call controlling device 2 to transfer a call to an outdoor phone terminal (i.e., the circuit used for phone calls). Specifically, the server 7 carries out internet communication, for example, with the incoming call controlling device 2 and with the mobile phone terminal 6 in accordance with the Hypertext Transfer Protocol (HTTP) to transmit and/or receive information.

As illustrated in FIG. 1, the incoming call controlling device 2 includes a connection determining unit 3, an incoming call controlling unit 4, and a caller information transmitting unit 5. When an incoming call to the first phone number is received, the connection determining unit 3 determines whether the mobile phone terminal 6 is connected as an extension phone to the incoming call controlling device 2. In other words, the connection determining unit 3 determines whether the mobile phone terminal 6 is connected as a target of incoming call control to the incoming call controlling device 2. When the connection determining unit 3 has determined that the mobile phone terminal 6 is not connected to the incoming call controlling device 2, the incoming call controlling unit 4 transfers the incoming call made to the first phone number to the second phone number, which is the mobile phone number of the mobile phone terminal 6. The incoming call controlling unit 4 transfers the incoming call by calling the second phone number with a predetermined phone number stored in the incoming call controlling device 2 used as a caller number. Therefore, the caller's phone number provided to the mobile phone terminal 6 in this transfer is not the true caller number but the aforementioned predetermined phone number. When the incoming call controlling unit 4 transfers the incoming call, the caller information transmitting unit 5 transmits, to the server 7, identification information for identifying the mobile phone terminal 6 and the caller information of the incoming call described above.

Upon receiving the information from the caller information transmitting unit 5, the server 7 transmits the caller information of the incoming call made to the first phone number to the mobile phone terminal 6 identified by the received identification information via a circuit different from the call circuit. The mobile phone terminal 6 displays the caller information received from the server 7 on a display unit, such as a display, provided in the mobile phone terminal 6 through a process of a predetermined application program. As described above, the mobile phone terminal 6 is not notified of the true caller number in the incoming call transfer. In other words, the true caller number is not provided via the call circuit. Therefore, the true caller number is not recorded in the incoming call history of a mobile phone's typical phone function, and thus this configuration is preferable for security reasons. Meanwhile, the mobile phone terminal 6 can provide the user with the caller information obtained from the server 7. The caller information obtained from the server 7 can be displayed through an application program of the mobile phone terminal 6. Therefore, the display of the caller information can easily be so controlled as to appear temporarily with the application program. In other words, the true caller number can be provided without being left in the incoming call history. In this manner, with the incoming call controlling system 1, when the mobile phone terminal 6 used as an extension phone terminal is being carried outdoors, the mobile phone terminal 6 can appropriately be notified of the caller information.

Example Embodiments

Figure 2:
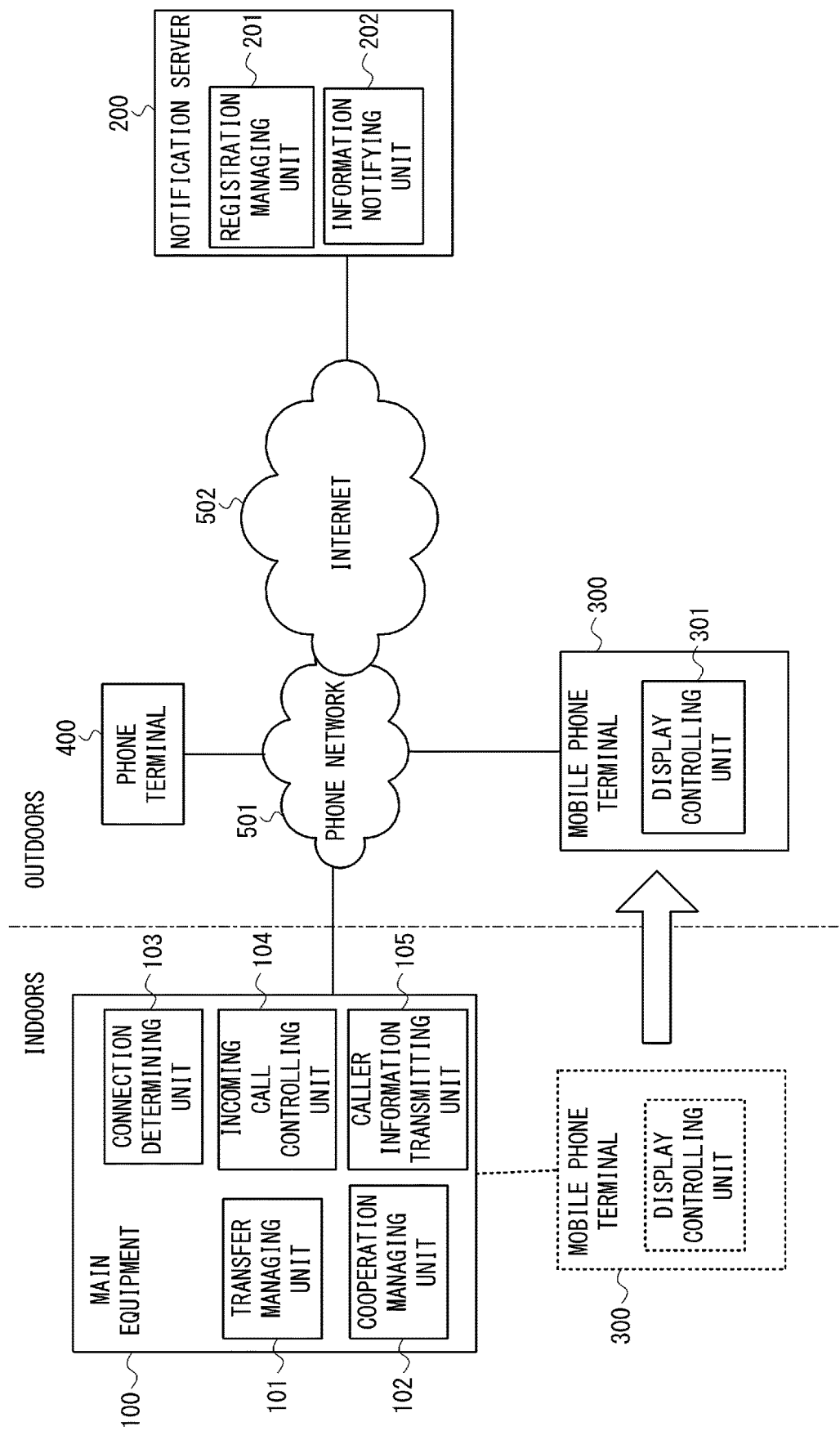
FIG. 2 is a block diagram illustrating an example of a configuration of an incoming call controlling system according to an example embodiment.

An example embodiment will now be described. FIG. 2 is a block diagram illustrating an example of a configuration of an incoming call controlling system 10 according to an example embodiment. The incoming call controlling system 10 corresponds to the incoming call controlling system 1 illustrated in FIG. 1. The incoming call controlling system 10 mainly includes a main equipment 100, a notification server 200, and a mobile phone terminal 300. The main equipment 100 corresponds to the incoming call controlling device 2 illustrated in FIG. 1. The notification server 200 corresponds to the server 7 illustrated in FIG. 1. The mobile phone terminal 300 corresponds to the mobile phone terminal 6 illustrated in FIG. 1. The main equipment 100 is communicably connected to the notification server 200 via a phone network 501 and an internet 502. The mobile phone terminal 300 can also be communicably connected to the notification server 200 via the phone network 501 and the internet 502. The phone network 501 is, for example, an Internet Protocol (IP) phone network, a mobile phone network, a public switched telephone network, or the like and is connected to the internet 502. Therefore, as described above, the main equipment 100 and the mobile phone terminal 300 connected to the phone network 501 can communicate with the notification server 200 over the internet 502.

The main equipment 100 is a private branch exchange that controls outgoing phone calls and incoming phone calls. The main equipment 100 is provided with a dial-in function and controls outgoing calls from and incoming calls to each phone terminal associated with predetermined N phone numbers. In the present example embodiment, incoming call control of the mobile phone terminal 6 carried outdoors from an indoor location will be described. Therefore, FIG. 2 illustrates only the mobile phone terminal 300 used both indoors and outdoors as a phone terminal to be connected to the main equipment 100. However, another phone terminal may be connected to the main equipment 100. In other words, the main equipment 100 may be connected not only to the mobile phone terminal 300 but also to a fixed-line phone, a mobile phone dedicated for indoor use, and so on. In addition, although FIG. 2 illustrates a single mobile phone terminal 300 connected to the main equipment 100, there may be a plurality of mobile phone terminals 300 connected to the main equipment 100.

In the present example embodiment, a phone terminal 400 calls one of the predetermined N phone numbers described above. The phone terminal 400 may be a fixed-line phone or a mobile phone. The mobile phone terminal 300 is used indoors and outdoors and is, for example, a mobile phone, such as a smartphone. In the following description, the phone number of the phone terminal 400 is xx-xxxx-0001. In this description, xx-xxxx-0001 corresponds to the "true caller number" described above. The phone numbers (the phone numbers assigned through a contract with a phone company) of the main equipment 100 are yy-yyyy-0001, yy-yyyy-0002, yy-yyyy-0003, yy-yyyy-0004, and yy-yyyy-0005. In other words, the main equipment 100 has the above five numbers as the phone numbers available for dial-in. In the main equipment 100, the mobile phone terminal 300 is associated with yy-yyyy-0001. The mobile phone number (the phone number assigned through a contract with a mobile phone company) of the mobile phone terminal 300 is zzz-zzzz-0001.

When the mobile phone terminal 300 is connected to the main equipment 100 indoors, the mobile phone terminal 300 functions as an extension phone terminal that can be reached by calling the phone number yy-yyyy-0001. In other words, when the mobile phone terminal 300 is connected to the main equipment 100, the main equipment 100 routes an incoming call made to the phone number yy-yyyy-0001 to the mobile phone terminal 300. Meanwhile, when the mobile phone terminal 300 is not connected to the main equipment 100 (i.e., when the mobile phone terminal 300 is being carried outdoors), the mobile phone terminal 300 functions as a normal mobile phone that can be reached by calling the phone number zzz-zzzz-0001.

The notification server 200 carries out the internet communication in accordance with the HTTP and notifies a phone terminal of caller information. Specifically, the notification server 200 notifies the phone terminal of the caller information via a network circuit different from a circuit used for calls (i.e., the circuit used by the main equipment 100 to transfer calls). As illustrated in FIG. 2, the notification server 200 includes a registration managing unit 201 and an information notifying unit 202.

The registration managing unit 201 manages information on a phone terminal to which a caller information notification service is to be provided by the notification server 200. For example, the registration managing unit 201 manages identification information and so on for identifying a phone terminal to which the notification service is to be provided. For this identification information, any identification information that allows a phone terminal to be uniquely identified can be used. For example, the identification information may be an identifier (ID) pre-assigned to a phone terminal or may be a phone number of a phone terminal. For example, the mobile phone terminal 300 is registered in the registration managing unit 201 as a phone terminal to which the notification service is to be provided. The registration managing unit 201 transmits, to the main equipment 100, information on a phone terminal to which the notification service is to be provided. Therefore, the main equipment 100 can determine, for each phone terminal connected to the main equipment 100, whether the notification service is to be provided thereto.

The information notifying unit 202 notifies a phone terminal of caller information on the basis of the identification information for identifying the phone terminal and the caller information that are received from the main equipment 100. For example, the phone terminal 400 may call the phone number yy-yyyy-0001 while the mobile phone terminal 300 is not being connected to the main equipment 100. In this case, as will be described later, a caller information transmitting unit 105 of the main equipment 100 transmits, to the notification server 200, the identification information for identifying the mobile phone terminal 300 and the caller information of the phone terminal 400. For example, the notification server 200 receives, from the main equipment 100, the ID information of the mobile phone terminal 300 and the phone number of the phone terminal 400 (i.e., xx-xxxx-0001). The information notifying unit 202 transmits the phone number of the phone terminal 400 to the mobile phone terminal 300 identified by the received identification information through the HTTP communication.

The information notifying unit 202 may transmit, as the caller information, various pieces of information on the user of the phone terminal 400 in place of or in addition to the phone number of the phone terminal 400. Specifically, the information notifying unit 202 may transmit, for example, information such as the name, the company name, or the address. In this case, for example, the notification server 200 may have the phone number and these pieces of information associated with each other and prestored in a storage device, such as a memory, as phone directory data. Then, the notification server 200 may determine the caller information by referring to these pieces of information. The phone directory data may also be prestored in a storage device of the main equipment 100, and the caller information transmitting unit 105 of the main equipment 100 may transmit the caller information, such as the name of the user of the phone terminal 400, to the notification server 200.

The mobile phone terminal 300 includes a display controlling unit 301. The display controlling unit 301 performs control of displaying, on the display of the mobile phone terminal 300, information received from the notification server 200, upon receiving an incoming call transferred by the main equipment 100. The display controlling unit 301 is implemented as a processor executes an application program installed in the mobile phone terminal 300. The display controlling unit 301 provides, on the display, a pop-up display of caller information written in Hypertext Markup Language (HTML), for example. In addition, the display controlling unit 301 terminates the pop-up display of the caller information, upon a predetermined condition (e.g., a start of a phone conversation, an end of a phone conversation, etc.) having been met. This enables the control of temporarily displaying the caller information. As will be described later, an incoming call controlling unit 104 of the main equipment 100 transfers an incoming call by calling the phone number zzz-zzzz-0001 with a predetermined phone number used as a caller number. Therefore, the caller's phone number provided to the mobile phone terminal 300 via the phone circuit is not xx-xxxx-0001. Accordingly, the true caller number (xx-xxxx-0001) is not left in the incoming call history of the mobile phone terminal 300.

Now, prior to describing the details of the main equipment 100, incoming call control according to a comparative example will be described in order to facilitate understanding of the present example embodiment. In the incoming call control according to the comparative example, a main equipment is controlled to allow a mobile phone terminal used outdoors to be notified of caller information by a notification server 200, and this control is different from the control of the main equipment 100 according to the present example embodiment. In the comparative example, the following two cases are assumed as use modes for a mobile phone terminal used outdoors that is to be notified of caller information by the notification server 200.

<Case 1>

In Case 1, a user uses a phone terminal for indoor use (hereinafter, referred to as a phone terminal A) indoors and uses a mobile phone terminal (hereinafter, referred to as a phone terminal A') outdoors that is a different terminal from the phone terminal A. In other words, the phone terminal A is connected to the main equipment all the time. In Case 1, the main equipment transfers, to the phone terminal A', an incoming call made to the phone number associated with the phone terminal A and transmits the caller information to the notification server 200. Thus, the notification server 200 provides the caller information.

<Case 2>

In Case 2, a user does not use any phone terminal connected to the main equipment and mainly uses a mobile phone terminal (hereinafter, referred to as a phone terminal B') outdoors. In Case 2, a virtual phone terminal (hereinafter, referred to as a phone terminal B) is registered in the main equipment. Then, the main equipment transfers, to the phone terminal B', an incoming call made to the phone number associated with the virtual phone terminal B and transmits the caller information to the notification server 200. Thus, the notification server 200 provides the caller information.

Figure 3:
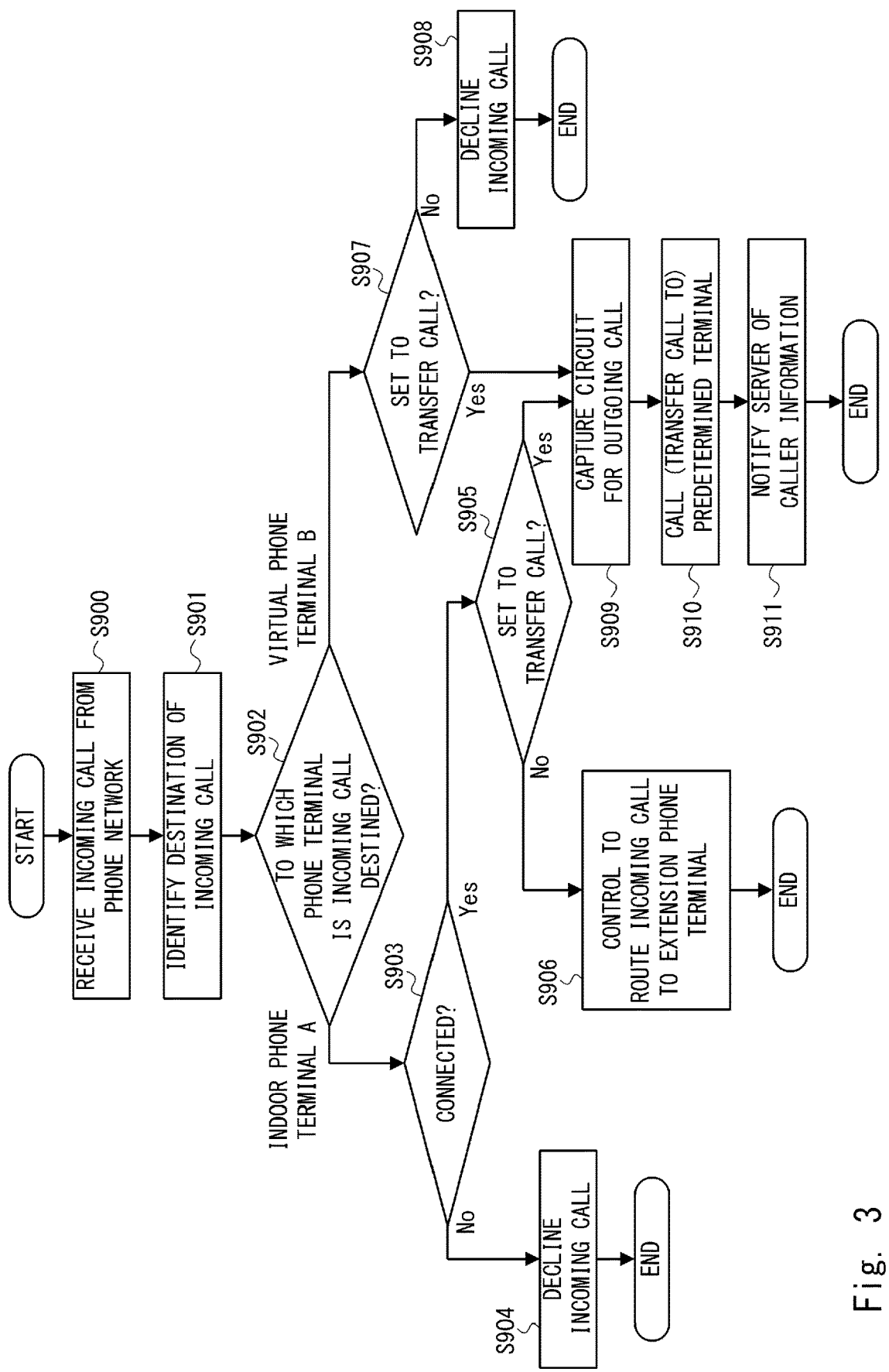
FIG. 3 is a flowchart illustrating an example of control of a main equipment according to a comparative example.

FIG. 3 is a flowchart illustrating an example of the control of the main equipment corresponding to Case 1 and Case 2 described above. Hereinafter, the incoming call control according to the comparative example will be described with reference to FIG. 3.

In step 900 (S900), the main equipment according to the comparative example receives an incoming call from the phone network 501. This incoming call is made by the phone terminal 400.

In step 901 (S901), the main equipment according to the comparative example identifies the destination of this incoming call. Here, to facilitate understanding of the control pertaining to the notification of the caller information by the notification server 200, the destination of the incoming call identified in step 901 is either the phone terminal A or the phone terminal B. In step 902 (S902), if the phone number of the incoming call is the phone number pre-associated with the phone terminal A, the process proceeds to step 903. Meanwhile, if the phone number of the incoming call is the phone number pre-associated with the virtual phone terminal B, the process proceeds to step 907.

In step 903 (S903), the main equipment according to the comparative example checks whether the phone terminal A that is supposed to be connected to the main equipment all the time is connected to the main equipment. If the phone terminal A is not connected to the main equipment (No in step 903), the main equipment declines the incoming call (step 904 (S904)).

If the phone terminal A is connected to the main equipment (Yes in step 903), the main equipment determines whether the phone terminal A is set to transfer a call (step 905) (S905)). If the phone terminal A is not set to transfer a call, in step 906 (S906), the main equipment performs control to route the incoming call to the phone terminal A, which is an extension phone terminal. If the phone terminal A is set to transfer a call, the process proceeds to step 909. In order to receive a notification from the notification server 200 with regard to an incoming call outdoors, the phone terminal A needs to be set to transfer a call to the phone terminal A'.

If the destination of the incoming call received by the main equipment is the virtual phone terminal B, the main equipment determines whether the phone terminal B is set to transfer a call (step 907 (S907)). If the phone terminal B is not set to transfer a call, the main equipment declines the incoming call (step 908 (S908)). If the phone terminal B is set to transfer a call, the process proceeds to step 909. In order to receive a notification from the notification server 200 with regard to an incoming call outdoors, the phone terminal B needs to be set to transfer a call to the phone terminal B'.

In step 909 (S909), the main equipment captures a circuit for outgoing calls in order to transfer a call.

After step 909, in step 910 (S910), the main equipment calls a predetermined phone terminal. In other words, if the destination of the incoming call identified in step 901 is the phone terminal A, the main equipment transfers the call to a predetermined phone terminal (phone terminal A') in accordance with the transfer setting of the phone terminal A. In a similar manner, if the destination of the incoming call identified in step 901 is the phone terminal B, the main equipment transfers the call to a predetermined phone terminal (phone terminal B') in accordance with the transfer setting of the phone terminal B.

Then, in step 911 (S911), the main equipment transmits, to the notification server 200, the identification information of the phone terminal identified in step 901 along with the caller information. Thus, the phone terminal A' or B' is notified of the caller information, such as the phone number of the phone terminal 400, via the notification server 200.

With the control according to the comparative example, the mobile phone terminal used outdoors can be notified of the caller information by the notification server 200. However, the use of the control according to the comparative example suffers from shortcomings in that two phone terminals including one for indoor use and one for outdoor use are required (the problem in Case 1) or in that the user needs to give up using a phone terminal indoors (the problem in Case 2). Here, the phone terminal A and the virtual phone terminal B may both be registered in the main equipment, and a dial-in phone number may be associated with the phone terminal A for indoor use and associated with the phone terminal B for outdoor use. Thus, a single phone terminal can be used both indoors and outdoors. However, in this case, the associative relationship between the dial-in phone number and the phone terminal needs to be changed, leading to low usability.

Therefore, there is a need for a mechanism that makes it possible to be notified of the caller information by the notification server 200 when a single mobile phone terminal is used both indoors and outdoors. The main equipment 100 according to the present example embodiment enables such a mechanism. Hereinafter, details of the main equipment 100 according to the present example embodiment will be described.

As illustrated in FIG. 2, the main equipment 100 includes a transfer managing unit 101, a cooperation managing unit 102, a connection determining unit 103, the incoming call controlling unit 104, and the caller information transmitting unit 105.

The transfer managing unit 101 manages a transfer setting of each phone terminal registered in the main equipment 100. Specifically, the transfer managing unit 101 manages the transfer setting of each phone terminal associated with the phone numbers (e.g., yy-yyyy-0001, yy-yyyy-0002, yy-yyyy-0003, yy-yyyy-0004, and yy-yyyy-0005) that can reach the main equipment 100. For example, the transfer managing unit 101 holds transfer setting information for setting an incoming call made to yy-yyyy-0001 associated with the mobile phone terminal 300 to be transferred to zzz-zzzz-0001, which is the mobile phone number associated with the mobile phone terminal 300. The transfer setting information may be registered, edited, or deleted in accordance with an input device connected to the main equipment 100 or may be registered, edited, or deleted in accordance with an instruction transmitted to the main equipment 100. Therefore, the transfer setting information may be registered, edited, or deleted in accordance with an instruction transmitted by the mobile phone terminal 300, for example.

The cooperation managing unit 102 manages information indicating whether each phone terminal associated with the phone numbers that can reach the main equipment 100 is a terminal to be notified of the caller information in cooperation with the notification server 200. The cooperation managing unit 102 manages whether a given phone terminal is to be notified of the caller information in cooperation with the notification server 200 (whether the phone terminal is to be provided with the notification service) on the basis of information acquired from the registration managing unit 201 of the notification server 200.

The connection determining unit 103 determines whether a phone terminal pre-associated with the phone number of the destination of the received incoming call is connected as an extension phone to the main equipment 100. Specifically, when the connection determining unit 103 has received an incoming call to yy-yyyy-0001, the connection determining unit 103 determines whether the mobile phone terminal 300 pre-associated as the destination of the incoming call to yy-yyyy-0001 is currently connected to the main equipment 100, for example. In other words, with this determination, it is determined whether the mobile phone terminal 300 is being carried outdoors.

The incoming call controlling unit 104 performs control of routing a call received by the main equipment 100 to a phone terminal connected to the main equipment 100 or to another phone terminal in accordance with the transfer setting managed by the transfer managing unit 101. A specific control process of the incoming call controlling unit 104 will be described later with reference to the flowchart illustrated in FIG. 4.

When a call is transferred by the incoming call controlling unit 104, the caller information transmitting unit 105 transmits, to the notification server 200, the identification information for identifying the phone terminal that is the destination of the incoming call and the caller information. Specifically, for example, when the incoming call controlling unit 104 transfers an incoming call made to yy-yyyy-0001, the caller information transmitting unit 105 transmits, to the notification server 200, the identification information for identifying the phone terminal (i.e., the mobile phone terminal 300) pre-associated as the destination of the incoming call made to yy-yyyy-0001 and the caller information. The caller information to be transmitted is the caller's phone number xx-xxxx-0001, for example. The caller information transmitting unit 105 communicates with the notification server 200 through the HTTP communication via the phone network 501 and the internet 502, for example.

Figure 4:
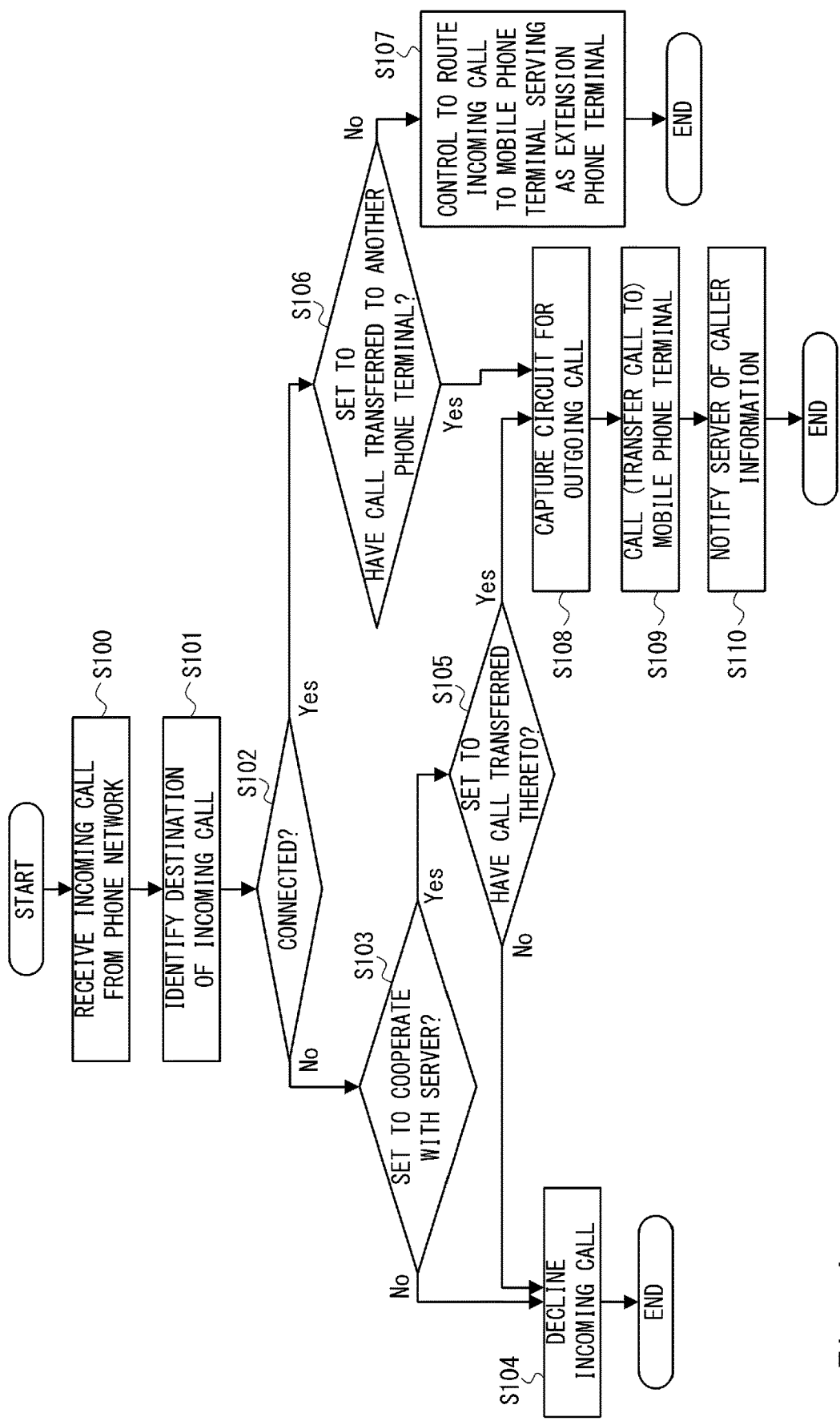
FIG. 4 is a flowchart illustrating an example of control of a main equipment according to an example embodiment.

FIG. 4 is a flowchart illustrating an example of the control of the main equipment 100 according to the present example embodiment. Hereinafter, the incoming call control of the main equipment 100 according to the present example embodiment will be described with reference to FIG. 4.

In step 100 (S100), the incoming call controlling unit 104 receives an incoming call from the phone network 501. This incoming call is made by the phone terminal 400.

Then, in step 101 (S101), the incoming call controlling unit 104 identifies the destination of the received incoming call. Here, to facilitate understanding of the control pertaining to the notification of the caller information by the notification server 200, the incoming call control of a call made to the phone number yy-yyyy-0001 associated with the mobile phone terminal 300 will be described below. Therefore, in step 101, the incoming call controlling unit 104 identifies the mobile phone terminal 300 as the destination of the incoming call.

In step 102 (S102), the connection determining unit 103 determines whether the mobile phone terminal 300 identified in step 101 is connected to the main equipment 100. The connection determining unit 103 determines the connection state of the mobile phone terminal 300 on the basis of a keep-alive monitoring result, for example. If the mobile phone terminal 300 is connected to the main equipment 100, the process proceeds to step 103. If the mobile phone terminal 300 is not connected to the main equipment 100, the process proceeds to step 106.

In step 103 (S103), the incoming call controlling unit 104 determines whether the incoming call control in cooperation with the notification server 200 is set to be performed on the mobile phone terminal 300 identified in step 101. Specifically, the incoming call controlling unit 104 determines whether the mobile phone terminal 300 is preregistered to be provided with the notification service of the notification server 200 on the basis of the information managed by the cooperation managing unit 102. If the mobile phone terminal 300 is not to be provided with the notification service, the process proceeds to step 104. If the mobile phone terminal 300 is to be provided with the notification service, the process proceeds to step 105.

In step 104 (S104), the incoming call controlling unit 104 declines the incoming call. Specifically, the incoming call controlling unit 104 declines the incoming call without performing a transfer process, described later, when the mobile phone terminal 300 is not preregistered to be provided with the service of the notification server 200. This prevents a call from being transferred to a phone terminal that is not to be provided with the notification service.

In step 105 (S105), the incoming call controlling unit 104 determines whether the mobile phone terminal 300 identified in step 101 is set to have a call transferred thereto. Specifically, the incoming call controlling unit 104 determines whether the mobile phone terminal 300 is set to have a call transferred thereto (set to have a call transferred to the phone number zzz-zzzz-0001) on the basis of the information managed by the transfer managing unit 101. If the mobile phone terminal 300 is not set to have a call transferred thereto, the process proceeds to step 104. If the mobile phone terminal 300 is set to have a call transferred thereto, the process proceeds to step 108. In step 108 and thereafter, the transfer process is performed. In this manner, when the connection determining unit 103 has determined that the mobile phone terminal 300 is not connected to the main equipment 100, the incoming call controlling unit 104 transfers an incoming call to the mobile phone terminal 300 if the mobile phone terminal 300 is preset to have a call transferred thereto. Meanwhile, when the connection determining unit 103 has determined that the mobile phone terminal 300 is not connected to the main equipment 100, the incoming call controlling unit 104 declines an incoming call if the mobile phone terminal 300 is not preset to have a call transferred thereto. Therefore, an appropriate process (i.e., a transfer process or an incoming call decline) can be performed in accordance with whether the mobile phone terminal 300 can accept an incoming call.

If the mobile phone terminal 300 is not connected to the main equipment 100, in step 106 (S106), as in step 105, the incoming call controlling unit 104 determines whether the mobile phone terminal 300 identified in step 101 is set to have a call transferred to another phone terminal. If the mobile phone terminal 300 is not set to have a call transferred to another phone terminal, the process proceeds to step 107. If the mobile phone terminal 300 is set to have a call transferred to another phone terminal, the process proceeds to step 108.

In step 107 (S107), the incoming call controlling unit 104 performs control of routing the incoming call to the mobile phone terminal 300 serving as an extension phone terminal.

In this manner, when the connection determining unit 103 has determined that the mobile phone terminal 300 is connected to the main equipment 100, the incoming call controlling unit 104 routes an incoming call to the mobile phone terminal 300 connected to the main equipment 100. Therefore, the mobile phone terminal 300 can be used as an extension phone terminal.

In contrast, if the mobile phone terminal 300 is set to have a call transferred to another phone terminal, in step 108 (S108), the incoming call controlling unit 104 captures a circuit for outgoing calls in order to transfer a call. Specifically, the incoming call controlling unit 104 determines a subscriber line to be used to call a phone terminal to which a call is to be transferred from the main equipment 100. At this point, since one subscriber line is already being used for the call from the phone terminal 400 to the main equipment 100, the incoming call controlling unit 104 secures another available subscriber line to call the phone terminal to which a call is to be transferred.

After step 108, in step 109 (S109), the incoming call controlling unit 104 calls the phone terminal to which a call is to be transferred with the use of the circuit captured in step 108. Specifically, when the process of this step is executed via step 105, the incoming call controlling unit 104 calls zzz-zzzz-0001, which is the phone number of the mobile phone terminal 300. Meanwhile, when the process of this step is executed via step 106, the incoming call controlling unit 104 calls the phone number of the other phone terminal set as a transfer destination. Thus, an incoming call is transferred. At this point, a first subscriber line is used for the call from the phone terminal 400 to the main equipment 100, and a second subscriber line is used for the call from the main equipment 100 to the phone terminal of the transfer destination. Therefore, the phone terminal of the transfer destination (e.g., the mobile phone terminal 300 when the process of this step is executed via step 105) and the phone terminal 400 can communicate via the first subscriber line and the second subscriber line. The caller's phone number in the call made in step 109 is, for example, a predetermined phone number, such as yy-yyyy-0001. In other words, the caller's phone number in the call made in step 109 is not the true caller number xx-xxxx-0001 of the call being transferred.

In step 110 (S110), the incoming call controlling unit 104 transmits, to the notification server 200, the identification information for identifying the mobile phone terminal 300 along with the caller information. This identification information may be any identification information that allows a phone terminal of a transfer destination to be identified and may be, for example, an identifier of the mobile phone terminal 300 or a phone number (yy-yyyy-0001) pre-associated with the mobile phone terminal 300. The caller information may be the phone number (xx-xxxx-0001) of the phone terminal 400 or may be another piece of information for identifying the caller. Upon receiving the information transmitted in step 110, the notification server 200 notifies the user of the caller information. Thus, the user can confirm that the call is from the phone terminal 400.

As described above, the transfer destination may be a phone terminal different from the mobile phone terminal 300. In other words, the incoming call controlling unit 104 may perform the following control, as indicated in steps 106 to 110. When it has been determined that the mobile phone terminal 300 is connected to the main equipment 100 and when no transfer to another phone terminal is preset, the incoming call controlling unit 104 routes an incoming call to the mobile phone terminal 300 connected to the main equipment 100. Meanwhile, when it has been determined that the mobile phone terminal 300 is connected to the main equipment 100 and when a transfer to another phone terminal is preset, the incoming call controlling unit 104 transfers an incoming call to the other phone terminal set as the transfer destination. Then, when the incoming call is transferred to the other phone terminal by the incoming call controlling unit 104, the caller information transmitting unit 105 transmits, to the notification server 200, the identification information for identifying this other phone terminal and the caller information. This control enables an appropriate process in accordance with the transfer setting when the mobile phone terminal 300 is connected to the main equipment 100.

In the flowchart illustrated as an example in FIG. 4, when the mobile phone terminal 300 is not connected to the main equipment 100 (No in step 103), a process of keeping a call from being transferred is performed in accordance with whether the mobile phone terminal 300 is to be provided with the notification service (step 104). However, when the mobile phone terminal 300 is connected to the main equipment 100 as well, a process of keeping a call from being transferred may be performed in accordance with whether the mobile phone terminal 300 is to be provided with the notification service. In other words, step 103 and step 104 may be inserted immediately before step 108, for example.

Thus far, example embodiments have been described. Each constituent element of the main equipment 100, the notification server 200, and the mobile phone terminal 300 illustrated in FIG. 2 is implemented upon a program being executed, for example. In other words, the transfer managing unit 101, the cooperation managing unit 102, the connection determining unit 103, the incoming call controlling unit 104, and the caller information transmitting unit 105 are implemented as a program including various instructions stored in a memory included in the main equipment 100 is executed by a processor included in the main equipment 100, for example. The registration managing unit 201 and the information notifying unit 202 are implemented as a program including various instructions stored in a memory included in the notification server 200 is executed by a processor included in the notification server 200, for example. The display controlling unit 301 is implemented as a program including various instructions stored in a memory included in the mobile phone terminal 300 is executed by a processor included in the mobile phone terminal 300, for example.

The above-described programs can be stored with the use of various types of non-transitory computer-readable media and supplied to a computer. The non-transitory computer-readable media include various types of tangible storage media. Examples of the non-transitory computer-readable media include a magnetic storage medium (e.g., flexible disk, magnetic tape, hard disk drive), an optical magnetic storage medium (e.g., magneto-optical disk), a compact disc read-only memory (CD-ROM), a CD-R, a CD-R/W, and a semiconductor memory (e.g., mask ROM, programmable ROM (PROM), erasable PROM (EPROM), flash ROM, random-access memory (RAM)). In addition, the programs may be supplied to a computer in the form of various types of transitory computer-readable media. Examples of the transitory computer-readable media include an electric signal, an optical signal, and an electromagnetic wave. The transitory computer-readable media can supply the programs to a computer via a wired communication line, such as an electric wire or an optical fiber, or via a wireless communication line.

Each constituent element in the main equipment 100, the notification server 200, and the mobile phone terminal 300 is not limited to be implemented by software through a program and may be implemented by a hardware circuit or any combination of hardware, firmware, and software.

It is to be noted that the present invention is not limited to the example embodiments described above, and modifications can be made as appropriate within the scope that does not depart from the technical spirit.

Thus far, the invention of the present application has been described with reference to the example embodiments, but the invention of the present application is not limited by the foregoing. Various modifications that a person skilled in the art can appreciate can be made to the configurations and the details of the invention of the present application within the scope of the invention.

REFERENCE SIGNS LIST

1 INCOMING CALL CONTROLLING SYSTEM
2 INCOMING CALL CONTROLLING DEVICE
3 CONNECTION DETERMINING UNIT
4 INCOMING CALL CONTROLLING UNIT
5 CALLER INFORMATION TRANSMITTING UNIT
6 MOBILE PHONE TERMINAL
7 SERVER
10 INCOMING CALL CONTROLLING SYSTEM
100 MAIN EQUIPMENT
101 TRANSFER MANAGING UNIT
102 COOPERATION MANAGING UNIT
103 CONNECTION DETERMINING UNIT
104 INCOMING CALL CONTROLLING UNIT
105 CALLER INFORMATION TRANSMITTING UNIT
200 NOTIFICATION SERVER
201 REGISTRATION MANAGING UNIT
202 INFORMATION NOTIFYING UNIT
300 MOBILE PHONE TERMINAL
301 DISPLAY CONTROLLING UNIT
400 PHONE TERMINAL
501 PHONE NETWORK
502 INTERNET

The invention claimed is:

1. An incoming call controlling device configured to control an incoming call from a phone network, the incoming call controlling device comprising:
at least one memory storing program instructions; and
at least one processor configured to execute the instructions to:
determine, when an incoming call to a first phone number is received, whether a mobile phone terminal pre-associated with the first phone number is connected as an extension phone to the incoming call controlling device;
transfer the incoming call to a second phone number when it has been determined that the mobile phone terminal is not connected to the incoming call controlling device, the second phone number being a mobile phone number of the mobile phone terminal; and
transmit, to a server, identification information for identifying the mobile phone terminal and caller information of the incoming call when the transferring is performed, the server being configured to notify a phone terminal of the caller information by using a network different from a circuit used for the transfer.

2. The incoming call controlling device according to claim 1, wherein the at least one processor is further configured to execute the instructions to route the incoming call to the mobile phone terminal connected to the incoming call controlling device when it has been determined that the mobile phone terminal is connected to the incoming call controlling device.

3. The incoming call controlling device according to claim 2, wherein when it has been determined that the mobile phone terminal is not connected to the incoming call controlling device, the at least one processor is further configured to execute the instructions to transfer the incoming call if a transfer to the mobile phone terminal is preset or decline the incoming call if a transfer to the mobile phone terminal is not preset.

4. The incoming call controlling device according to claim 3, wherein the at least one processor is further configured to execute the instructions to decline the incoming call without transferring the incoming call when the mobile phone terminal is not preregistered to be provided with a service by the server.

5. The incoming call controlling device according to claim 2, wherein
the at least one processor is further configured to execute the instructions to:
route the incoming call to the mobile phone terminal connected to the incoming call controlling device when it has been determined that the mobile phone terminal is connected to the incoming call controlling device and when a transfer to another phone terminal is not preset,
transfer the incoming call to another phone terminal when it has been determined that the mobile phone terminal is connected to the incoming call controlling device and when a transfer to another phone terminal is preset, and
transmit, to the server, identification information for identifying the other phone terminal and the caller information of the incoming call when the transferring is performed.

6. The incoming call controlling device according to claim 5, wherein the at least one processor is further configured to execute the instructions to decline the incoming call without transferring the incoming call when the mobile phone terminal is not preregistered to be provided with a service by the server.

7. The incoming call controlling device according to claim 2, wherein the at least one processor is further configured to execute the instructions to decline the incoming call without transferring the incoming call when the mobile phone terminal is not preregistered to be provided with a service by the server.

8. The incoming call controlling device according to claim 1, wherein when it has been determined that the mobile phone terminal is not connected to the incoming call controlling device, the at least one processor is further configured to execute the instructions to transfer the incoming call if a transfer to the mobile phone terminal is preset or decline the incoming call if a transfer to the mobile phone terminal is not preset.

9. The incoming call controlling device according to claim 8, wherein the at least one processor is further configured to execute the instructions to decline the incoming call without transferring the incoming call when the mobile phone terminal is not preregistered to be provided with a service by the server.

10. The incoming call controlling device according to claim 1, wherein the at least one processor is further configured to execute the instructions to decline the incoming call without transferring the incoming call when the mobile phone terminal is not preregistered to be provided with a service by the server.

11. An incoming call controlling system comprising:
an incoming call controlling device configured to control an incoming call from a phone network; and
a server configured to notify a phone terminal of caller information, wherein
the incoming call controlling device includes
at least one memory storing program instructions; and
at least one processor configured to execute the instructions to:
determine, when an incoming call to a first phone number is received, whether a mobile phone terminal pre-associated with the first phone number is connected as an extension phone to the incoming call controlling device,
transfer the incoming call to a second phone number when it has been determined that the mobile phone terminal is not connected to the incoming call controlling device, the second phone number being a mobile phone number of the mobile phone terminal, and
transmit, to the server, identification information for identifying the mobile phone terminal and the caller information of the incoming call when the transferring is performed, and
the server is configured to transmit the caller information of the incoming call to the mobile phone terminal identified by the identification information by using a network different from a circuit used for the transfer.

12. The incoming call controlling system according to claim 11, wherein the at least one processor is further configured to execute the instructions to route the incoming call to the mobile phone terminal connected to the incoming call controlling device when it has been determined that the mobile phone terminal is connected to the incoming call controlling device.

13. An incoming call controlling method comprising:
determining, when an incoming call to a first phone number is received, whether a mobile phone terminal pre-associated with the first phone number is connected as an extension phone to an incoming call controlling device;
transferring the incoming call to a second phone number when it has been determined that the mobile phone terminal is not connected to the incoming call controlling device, the second phone number being a mobile phone number of the mobile phone terminal; and
transmitting, to a server, identification information for identifying the mobile phone terminal and caller information of the incoming call when the transferring is performed, the server being configured to notify a phone terminal of the caller information by using a network different from a circuit used for the transferring.

* * * * *